US008566390B2

(12) United States Patent
Saillet et al.

(10) Patent No.: US 8,566,390 B2
(45) Date of Patent: Oct. 22, 2013

(54) METHOD AND SYSTEM FOR IMPROVING CLIENT-SERVLET COMMUNICATION

(75) Inventors: Yannick Saillet, Stuttgart (DE); Stefan Raspl, Bondorf (DE)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 11/817,672

(22) PCT Filed: Jul. 26, 2006

(86) PCT No.: PCT/EP2006/064658
§ 371 (c)(1),
(2), (4) Date: Aug. 11, 2008

(87) PCT Pub. No.: WO2007/028670
PCT Pub. Date: Mar. 15, 2007

(65) Prior Publication Data
US 2009/0125579 A1 May 14, 2009

(30) Foreign Application Priority Data
Sep. 8, 2005 (EP) .................................. 05108239

(51) Int. Cl.
*G06F 15/16* (2006.01)
(52) U.S. Cl.
USPC ........................................................ 709/203

(58) Field of Classification Search
USPC ........................................................ 709/203
See application file for complete search history.

(56) References Cited

U.S. PATENT DOCUMENTS

| 6,012,098 | A  | * | 1/2000 | Bayeh et al. .................. 709/246 |
| 7,426,535 | B2 | * | 9/2008 | Gershman et al. ............ 709/203 |
| 2002/0133567 | A1 | | 9/2002 | Te |
| 2003/0145048 | A1 | | 7/2003 | Susarla et al. |
| 2004/0168122 | A1 | * | 8/2004 | Kobipalayam Murugaiyan ................. 715/513 |

FOREIGN PATENT DOCUMENTS

| JP | 2005165530 A | 6/2005 |
| WO | 0127791 A2 | 4/2001 |

* cited by examiner

*Primary Examiner* — Hussein Elchanti
*Assistant Examiner* — Maceeh Anwari
(74) *Attorney, Agent, or Firm* — Terry J. Carroll; SVL IP Law Edell, Shapiro & Finnan, LLC

(57) ABSTRACT

The present invention provides a method and system for improving the client-Servlet communication in the World-Wide-Web (Web) without changing the existing communication protocol, and without changing the client. The Servlet identifies missing information not included in the initial client's web-browser request for retrieving the information desired, where the Servlet automatically opens another communication path for providing the missing information to the Servlet by making use of the HTTP-response functionality of the initial HTTP-request. The other communication path is supported by a further Servlet functionality component.

33 Claims, 3 Drawing Sheets

METHOD AND SYSTEM FOR IMPROVING CLIENT-SERVLET COMMUNICATION

FIELD OF THE PRESENT INVENTION

The present invention relates in general to Client-Server communication, and in particular to improving the Client-Servlet communication in the World Wide Web (Web) without changing the existing communication protocol and without changing the client, and more particularly to enhance the flexibility and interactivity of such Servlets in the case the Servlet identifies missing information not included in the initial client's web-browser request for retrieving the information desired.

BACKGROUND OF THE PRESENT INVENTION

The term "Client-Server" refers to a network application architecture which consists of client and servers communicating with each other via a communication protocol (e.g. HTTP).

Web refers an information space in which the items of interest, referred to as resources, are identified by global identifiers called Uniform Resource Identifiers (URIs). The Web is made up of three standards: The Uniform Resource Locator (URL), which specifies how each page of information is given a unique "address" at which it can be found; Hyper Text Transfer Protocol (HTTP), which specifies how the client and server send the information to each other, and Hyper Text Markup Language (HTML), a method of encoding the information so it can be displayed on a variety of devices.

The Web works as follow: When a client's web-browser (e.g. MICROSOFT's INTERNET EXPLORER, APPLE's SAFARI) is opened, it communicates on behalf of the client (or computer being used) using Hypertext Transfer Protocol (HTTP) and makes a web page request. Once the request is sent, the client's web-browser computer will wait for a hypertext data stream from the server. When the server gets the request, it looks for the requested file and, if present, sends it to the client's web-browser as requested.

Servlets are programs running on a server which wait for requests coming from a client's web-browser and generate a response to this request (for example as a dynamically generated Web-page).

PRIOR ART

The prior art way Servlets works is as follows:

A client's web-browser sends an HTTP-request to the Servlet by invoking its URL. The client's web-browser is not necessarily aware that it is invoking a Servlet. Invoking a Servlet is like loading any other web page, the difference being that parameters can be passed in the request to the Servlet and that the response sent back by the server is not a static document but is dynamically generated.)

The request is analyzed by the application server hosting the Servlets and is passed to the Servlet corresponding to the demanded URL.

The request is analyzed by the Servlet, eventual parameters are parsed and interpreted, and a document to return to the client's web-browser, is dynamically generated (the content of the document may depend on the eventual parameters passed by the client's web-browser in the request).

The generated document is received by the client's web-browser and is displayed or interpreted (in case it contains some executable scripts like JAVASCRIPT).

Servlets have transformed the internet by providing a powerful and scalable framework for presenting dynamic content: instead of publishing static documents whose content has to be updated regularly, Servlets allow the client's web-browser to append parameters to HTTP-requests and get current information based on its request. Without Servlets, it would be impossible to create interactive Web applications where the user interacts from his/her client's web-browser with the server.

However Servlets have one limitation: after a request is received, they have no way to ask the client's web-browser for missing information:

Servlets can receive, with an incoming request, a list of parameters that can influence the action done on the server, or the information returned by the server. For example if you order something on the Internet, press the "submit" button will send a request containing the list of ordered items to the server. The server will work with this list (update a database, etc.) and usually generates a confirmation page listing all the chosen items.

But with traditional Servlets, all parameters necessary to treat the request on the server have to be contained in the initial request sent by the client's web-browser: if the Servlet notices during the processing of a request that some additional information is not provided by the client's web-browser in the initial request, there is no way to suspend the processing, ask the client's web-browser for the missing information and resume the processing from the point where it was interrupted. This limits the application area of Servlets:

A client's web-browser has to know exactly what information the Servlet needs.

In its request, a client's web-browser may need to provide more information than what is really needed by the Servlet.

Traditional Servlets cannot handle unexpected situations requiring more information than provided by the client's web-browser request. If the request does not contain all necessary information, the traditional way to handle the problem is to stop the processing, return a Web page to the client's web-browser which replaces the original page and displays an error message or display a new page asking for the missing information and invoking the same or another Servlet with the new information.

This is not a very good method to handle missing information, because it may not be simple to stop a request processing in one Servlet invocation, and continue the transaction in another Servlet invocation. Also, it may confuse the user, since quite often, the same page is displayed again with a small annotation informing the user about what information is missing—this is problematic from a usability standpoint.

OBJECT OF THE PRESENT INVENTION

It is object of the present invention to provide a method and system for improving the Client-Servlet communication in the World Wide Web (Web) without changing the existing communication protocol and without changing the client, and more particularly to improve the flexibility and interactivity of such Servlets in the case the Servlet identifies missing information not included in the initial client's web-browser for retrieving the information desired.

SUMMARY OF THE PRESENT INVENTION

The present invention provides a method and system for improving the Client-Servlet communication without changing the existing communication protocol, and without changing the client.

The existing prior art one-way communication path between client and Servlet remains unchanged if the initial request includes all information for retrieving the desired information. However in the case the Servlet identifies missing information not included in the initial client's web-browser request for retrieving the information desired, Servlet automatically opens an another communication path for providing the missing information to the Servlet by making use of the HTTP-response functionality of said initial HTTP-request, wherein the another communication path is supported by a further Servlet functionality component and is characterized by the steps of: generating a script—when executed at the client's web-browser retrieves the missing information and invokes the further Servlet functionality component—by the Servlet, appending the script to said HTTP-response indicating it as a partial response, sending the HTTP-response including the script to the client's web-browser, suspending execution of the initial HTTP-response by the Servlet until the missing information will be available, receiving the missing information by the further Servlet functionality component, wherein the missing information is contained in a new HTTP-request created by the script during its execution on the client's web-browser, providing the missing information to the Servlet, and continuing execution of the initial HTTP-response by the Servlet using the missing information for retrieving the rest of the said HTTP-response and providing the rest of the HTTP-response to the client's web-browser for displaying.

The reason why Servlets have the limitation described in the prior art, stems from the way the HTTP protocol and Web browsers/servers are designed:

HTTP is the protocol used for the communication between a client's web-browser and a Web-server.

Usually the HTTP-protocol allows the client's web-browser to send a request to a web server (or an application server/a Servlet) to either send some information to the server (a POST request) or to get a document from the server (a GET request).

Independent of the type of request (GET or POST) sent by the client's web-browser, the server should always process it and return a response which contains a header containing a return code (indicating for example if the request could be successfully handled or not), and an eventual result document. When the request was successful, the client's web-browser usually displays the document returned by the server, replacing the original page which contained the link of the element that produced the request, with the response from the server.

If the request is long-running, the server can also send regularly parts of the response document before the whole document generation is completed. This way the user can read the beginning of the document without having to wait for the whole document to be generated and transmitted.

This is a one-way communication: the protocol only foresees a communication initiated by the client's web-browser. The server usually has no way to send a request to the client's web-browser.

To overcome this limitation, the present invention uses the fact that the server can send "partial document" to the client's web-browser before the whole response document is generated, and the fact that this partial document can contain JAVA-SCRIPTs which can be executed by the client's web-browser before the whole document is completely transmitted. JAVA-SCRIPT is a language that can be embedded in HTML pages and is interpreted by the client's web-browser.

With this invention a two-way communication between web-client and web-server is provided which works as follows (see FIG. 1):

a client's web-browser sends an HTTP-request to a main Servlet on an application server. With the request it can provide some initial parameters required by the Servlet to process the request;

the main Servlet receives the request 10, extracts and interprets the eventual parameters and starts to process the request by doing some actions on the server side, generating a response document 20;

(Up to this point, this is how prior art Servlets work).

during the processing of the request, the main Servlet notices that some information is missing and that this information has to be provided by the originator of the request 30. This information could be some missing data that the user has to enter, some system information about the client's web-browser itself or about the status of some other elements in the page displayed on the client's web-browser while the request is processed. It has to be information which can be retrieved with or without user interaction by executing a JAVASCRIPT on the client's web-browser;

the main Servlet suspends the processing of the request and the generation of the response and generates a JAVASCRIPT 40 which, when executed on the client's web-browser, does the following:

it retrieves (or asks the user for) the missing information;

it invokes a secondary Servlet passing the additionally retrieved information as a parameter and a key generated by the Servlet requesting the information;

the main Servlet appends the JAVASCRIPT generated in the previous step to the partially generated response document, and sends the partial response to the client's web-browser 50;

the main Servlet suspends its execution by waiting until it can find the information it is asking for in the Web session or in the shared memory, under the key it has generated before 60;

meanwhile the client's web-browser starts to display the partial document received from the main Servlet. If some content was already generated, it will be displayed. The JAVAS-CRIPTs embedded in the response are executed;

while executing the JAVASCRIPT embedded in the partial response document, the client's web-browser retrieves the missing information required by the main Servlet, encodes this information and the key, under which the information should be stored, into the URL of a secondary Servlet and sends a request to this secondary URL;

it is important to note that the result of this 2nd request—while the request to the main Servlet is still running—should not replace the current document displayed by the client's web-browser and interrupt the 1st request. This can be achieved by redirecting the result of the second request to a separate frame, or to a specific element of the page (image, embedded frame), or by using the JAVASCRIPT API to open programmatically an HTTP request;

the secondary Servlet receives the request 62 containing in its parameters a key/value pair with the information to store in the session 64 (or the memory shared with the 1st Servlet). Then it returns a success code to the client's web-browser 65. The client's web-browser can ignore the response of the secondary Servlet;

the main Servlet detects in the session (shared memory) that a value has been stored for the key it had generated. It extracts this value (70; which is the information it was missing to process the request), removes it from the session/shared memory and resumes the processing of the request;

the processing continues the rest of the response document is generated. If it appears that even more information is missing later on during the processing of the request, the last steps can be repeated, to sequentially ask the user for more information 80; and finally the request is completed and the client's web-browser receives and displays the full response document 80.

In a preferred embodiment of the present invention, the Servlets are implemented as Java Servlets. However the same method could be used for CGI script or any Servlet-similar programs hosted on a server and which provide dynamic content in response to HTTP requests.

In a further preferred embodiment of the present invention, the scripts are implemented as JAVASCRIPTs. However scripts (JAVASCRIPT), returned to the client's web-browser to retrieve the missing information, could be in any language (Java, Visual Basic, etc . . . ) that can be embedded in a Web page and executed on the fly by the client's web-browser.

In a further embodiment of the present invention, it is possible to create generic Servlets which receive very low level information (such as mouse or key events) from the user, and do a complex processing of this information. The client's web-browser simply sends the information about the mouse/key events produced by the user and does not know what the Servlet will do when sending the request or if it will do something with this information. The Servlet interprets this information, and when it judges that an action has to be taken when a particular event occurs, it can ask the client's web-browser to provide more information about the event or some other elements on the client's web-browser side and do a dynamic processing of the event dependant on the information returned by the client's web-browser.

In another further embodiment of the present invention, Servlets are used with complex processing paths. The initial request contains enough information to start the processing. During the processing, the Servlet can take different execution paths depending on the parameters, or data retrieved by the server from back-end systems (databases, etc . . . ). If at some point a decision has to be taken by the user about how the processing should continue, the Servlet can ask the client's web-browser to prompt the user for a decision. This decision can influence the further processing of the request, without interrupting the request. The processing can run in a single transaction.

In a further preferred embodiment of the present invention, a secondary Servlet is additionally provided. The secondary Servlets receives the new HTTP-request sent by the JAVASCRIPT, and stores the key value pair in the current HTTP-session object.

In a further embodiment of the present invention, instead of using a secondary Servlet, the JAVASCRIPT could send the request updating the HTTP-session to the main Servlet. But in this case a second instance of the main Servlet would start (in parallel to the first instance which is still generating the response to the main request and wait for the missing value).

In further embodiment of the present invention the HTTP-protocol could be replaced by other communication protocol that is characterized by a one way communication path initiating a request by said client's web-browser (3) for retrieving information from said Servlet (8), and by sending a response by said Servlet containing at least return code specifying success or failure of said request, and including the result of said request, if available.

BRIEF DESCRIPTION OF THE DRAWINGS

In the following preferred embodiments of the present invention will be described in greater detail by a way of example only making reference to the drawing in which:

FIG. 2A shows a preferred embodiment of the present invention in a client-server architecture.

Figure 1:
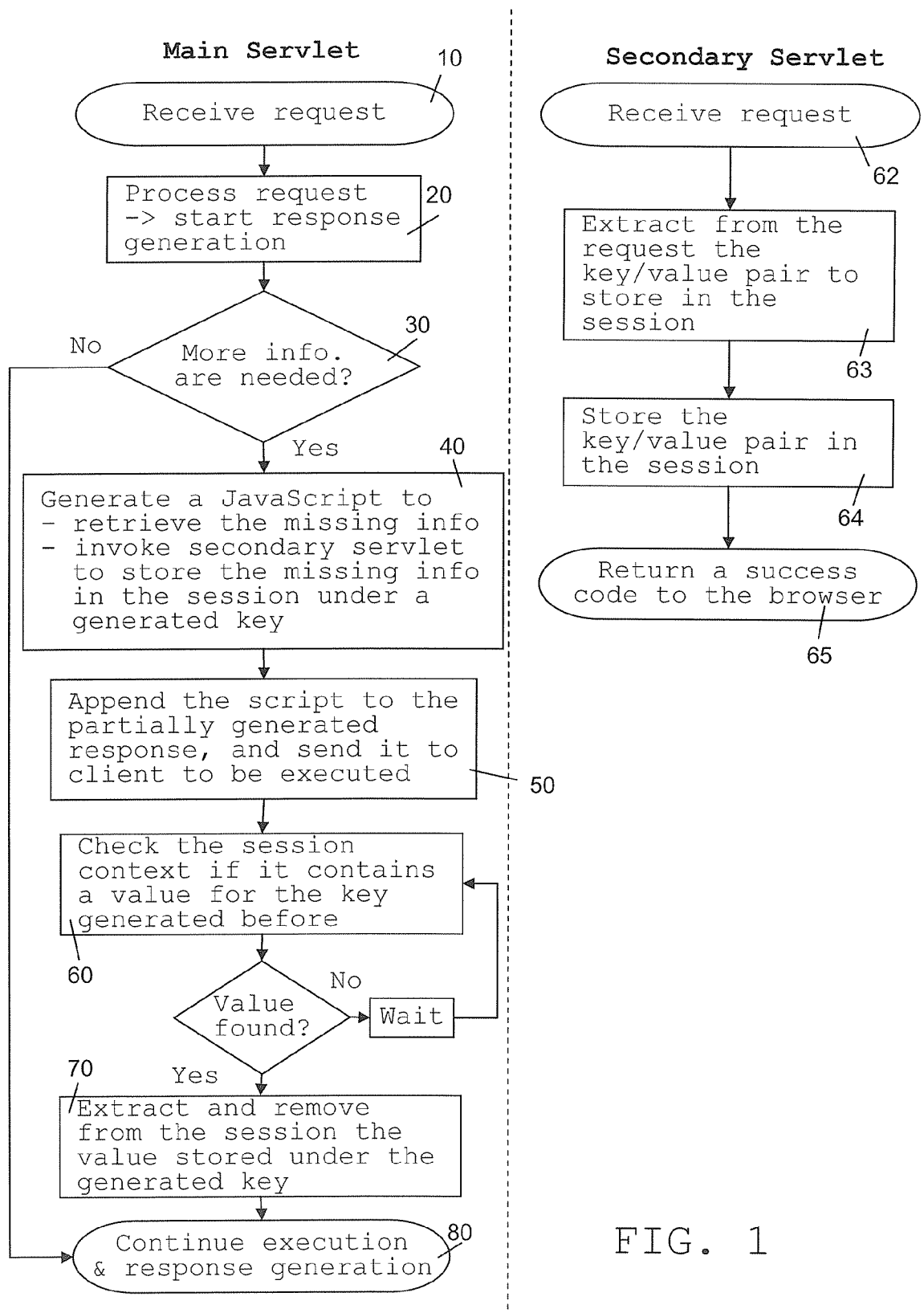
FIG. 1 shows the inventive two-way communication path of the present invention.

The present invention is made up of a client 1 and a server 2 side. The client side 1 is preferably a standard Client's web-browser 3 which is able to send HTTP-requests to a web-Server and to display HTML-documents returned by the Server. The client's web-browser 3 should be able to execute JAVASCRIPTs 12 embedded in the document 13 to display. Furthermore it should be able to display and executes the JAVASCRIPT 12 embedded in parts of the document 13 returned by the server before the whole document 3 has been transmitted. This is the standard behaviour of all actual client's web-browsers 3 available on the market.

Alternatively the format of the document 13 returned by the server and displayed in the client's web-browser 3 need not be necessary an HTML document 13. All document types that can be displayed by a client's web-browser 3 and that can contain script elements being interpreted by the web-browser 3 during the rendering can be used. Example of documents that could be used: XML, XHTML, SVG (Scalable Vector Graphics), XUL (XML User Interface Language), etc. (especially all kind of XML documents). The scripts 12 embedded in the document could be written in a language other than JAVASCRIPT. The support of JAVASCRIPT 12 in client's web-browser 3 (or its standardized version ECMA Script) is standard. However any kind of script or plug-in that can be embedded in the document 13 to be rendered by the web-browser 3, and that can be executed within the client's web-browser 3, to retrieve information about other elements in the document 13, or about the client's web-browser 3 or the user environments can be used. Examples could be: Visual Basic scripts, ActiveX components, Java applets, or native client's web-browser 3 plug-ins. The HTTP-protocol could be replaced by other communication protocol that is characterized by a one way communication path initiating a request by said client's web-browser 3 for retrieving information from said Servlet 8, and by sending a response by the Servlet 8 containing at least return code specifying success or failure of said request, and the result of said request, if available.

The server side 2 is preferably an application server 4 (e.g. a J2EE server like WebSphere, or Tomcat) with preferably a Servlet Container 6. Two Servlets—the main Servlet 8 and the secondary Servlet 10—are installed in this application server 4 in the preferred embodiment of the present invention.

Application server 4 need not be a J2EE server. Any kind of server which is able to respond dynamically to HTTP requests coming from client's web-browsers 3 can be used. Examples of technologies that can be used in place of a J2EE application server are: MICROSOFT .NET, or a simple Web-server which can execute CGI-scripts to display dynamic content. The Servlets 8, 10 and Servlet Container 6 can be replaced by similar technologies such as ASP, PHP or CGI scripts.

The invention—when implemented in its preferred embodiment—works as follow (see arrows in FIG. 2 A):

On the client side 1 the client's web-browser 3 sends a request to the main Servlet (1). The main Servlet 8 is the Servlet which implements the logic necessary to generate the document—page 13 to send to the client's web-browser 3 in response to the initial request. The main Servlet 8 receives the request, reads eventual parameters passed with the request and starts the generation of the document 13 to return it to client's the web-browser 3. The parameters passed with the request may influence the generation of the document 13. This invention does not depend on the logic used by the main Servlet 8 to generate the response document 13.

At some point during the generation of the response, the main Servlet 8 needs additional information that has not been provided by the client's web-browser 3 in the request (as parameter), but that could be easily retrieved by executing a JAVASCRIPT 12 on the client side 1 in the client's web-browser 3.

The main Servlet 8 inserts a JAVASCRIPT 12 in the document 13 it has started to generate. This script 12, when executed by the client's web-browser 3, retrieves the missing information, sends an HTTP-request to the secondary Servlet 10, the request containing as parameter a key generated by the main Servlet 8 (key can be any unique string generated randomly) and the value retrieved in the previous step.

Once the script 12 has been generated and inserted in the partial response, the main Servlet 8 flushes its buffer, so that the part of the response document 13 which has been generated until this points is immediately transmitted to the client's web-browser (2). The communication channel to the web-browser 3 is not closed. The header of the HTTP-response sent to the client's web-browser 3 indicates that the response uses a "Chunked Transfer Coding", as defined in HTTP 1.1. This encoding means that the response will not come in one single piece but in a series of chunks, and that the client's web-browser 3 should wait for new content until the server closes the connection.

Once the partially generated document 13 (the first chunk containing the beginning of the document and the JAVASCRIPT 12 retrieving the missing information), is transmitted to the client's web-browser 3, the client's web-browser 3 starts rendering the part of the document 13 which has been received so far and executes the embedded script 12, while waiting for the rest of the document.

The execution of this script 12 retrieves the missing value and sends another HTTP-request to the secondary Servlet 10. This request contains as parameter the key and the value retrieved in the previous step (3).

The ability to send additional HTTP-requests to different URL while the response of a $1^{st}$ HTTP request is being loaded is a normal behaviour for web-browsers 3. Without this capability, client's web-browsers 3 would not be able for instance to display images contained in the beginning of a long document being loaded, before the whole document is completely loaded.

The Secondary Servlet 10 receives the HTTP-request sent by the JAVASCRIPT 12, decodes the key and value included in the parameters of the request, and store this key value pair in the current HTTP-session object (4). The HTTP-session is an object which stores information about the current session between one client 1 and the server 2. The session object is passed to a Servlet each time it receives a request. If the same client's web-browser 3 sends HTTP-requests to several Servlets 8 contained in the same Servlet container 6 and in the same Web application, the same session object will be passed to the different Servlets 8. Servlets 8 can read write values in the session object (the values are stored under keys that can be used by later to retrieve the values). Using the HTTP-session is a common method in J2EE to pass values between different Servlets 8.

Instead of using a secondary Servlet 10, the JAVASCRIPT 12 could send the request updating the HTTP-session to the main Servlet 8. But in this case a second instance of the main Servlet 8 would start (in parallel to the $1^{st}$ instance which is still generating the response to the main request and wait for the missing value). The main Servlet 8 would then need to test when receiving the request whether the request is asking for a document or whether the request provides additional information that have been requested by other instances of the Servlet treating document requests (main requests). Technically this would be done by testing the parameters passed with the request. If a specific parameter is contained in the request, the main Servlet 8 would know that it should update the HTTP-session with a key/value pair contained in other parameters of the request. In any other case, the main Servlet 8 should generate a response document 13. By doing this, the main Servlet 8 would have 2 different logics depending on the parameters of the requests. This is exactly the same as having 2 different Servlets, each Servlet implementing a single logic.

The secondary Servlet 10 need not store the additional value passed by the $2^{nd}$ request (the request send by the JAVASCRIPT) in the HTTP-session to make it known by the main Servlet 8. Other methods could be storing the value in the System properties of the Java Virtual Machine of the Servlet container 6, or using other shared memory mechanism (dependant on the technology used by the application server). Another possibility would be to make the secondary Servlet 10 store this value in a file on a local disk of the server and make the main Servlet 8 read the same file.

Once the requested value is found by the main Servlet 8 in the shared memory (in the HTTP session), the main Servlet 8 wakes up and continue the generation of the document 13. With the missing information, the document can now be completely generated and the rest of the document is transmitted to the browser (5)—during the last steps the main Servlet 8 has regular checked the content of the HTTP-session to see if the value was available. Each time it checked the session and the value was not available, it slept for a small amount of time and checked again.

Once the Servlet closes the connection with the web-browser 3 (this is done automatically when the doGet( . . . ) or doPost( . . . ) method of the Servlet returns), the client's web-browser knows that the whole document has been downloaded.

A Servlet 8 could need more than one additional information from the client's web-browser to proceed a request. The retrieval of multiple missing information could be either done by repeating the steps described here several times during the processing of the request, or by generating one JAVASCRIPT 12 which retrieves and transmit all missing information to the secondary Servlet 10 in one HTTP-request. The secondary Servlet 10 must then decode several key/value pairs from the secondary request sent by the JAVASCRIPT and update the HTTP-session accordingly.

By using this method, a Servlet could request additional information from the client's web-browser 3, after the client's web-browser 3 has submitted its initial request, and during the processing of the request. The processing of the request did not have to be aborted and started from the beginning again as it would have to be without this invention.

No modifications are required in the web-browser 3 and in the application server 4. Both main 8 and secondary 10 Servlet are separately normal Servlets which receive an HTTP-request and return one single response to the originator of the request, as defined in the HTTP protocol. The protocol is not modified. All communication between the client's web-browser 3 and the server 2 are driven by the client's web-browser (as foreseen by the HTTP-protocol).

Only the collaboration between the two Servlets 8, 10 and the fact that a Servlet can remote control the client's web-browser 3 by chunking its response document and embed JAVASCRIPT commands in it makes the bi-directional communication between server and client's web-browser possible.

In the following a simple example shows how the present invention practically works (see FIG. 2 B).

It is assumed that there is a main Servlet 8 which receives a request from the client's web-browser 3 and generates some content in a way that is dependant on some properties of the client's web-browser 3 which sent the request. It is further assumed, that the main Servlet 8 needs to know the width of the client's web-browser window that sent the request, and that this information was not included in the initial request sent to the main Servlet 8.

The width of the client's web-browser window is a property that can be easily asked by executing the JAVASCRIPT expression "window.outerWidth" in the client's web-browser 3.

The code source of the main 8 and secondary 10 Servlets for this example is in the appendix at the end of this document. Note that the secondary Servlet is independent from the logic of the primary Servlet and can be reused or shared by several "main" Servlets implementing a different logic.

It is important to note that the result of this 2nd request—while the request to the main Servlet is still running—should not replace the current document displayed by the client's web-browser and interrupt the 1st request. This can be achieved by redirecting the result of the second request to a separate frame, or to a specific element of the page (image, embedded frame), or by using the JAVASCRIPT API to open programmatically an HTTP-request;

The secondary Servlet 10 receives the request containing in its parameters a key/value pair with the information to store in the session (or the memory shared with the 1st Servlet). Then it returns a success code to the web-browser 3. The web-browser 3 can ignore the response of the secondary Servlet 10;

The main Servlet 8 detects in the session (shared memory) that a value has been stored for the key it had generated. It extracts this value (which is the information it was missing to process the request), removes it from the session/shared memory and resumes the processing of the request;

The processing continues the rest of the response document is generated. If it appears that even more information is missing later on during the processing of the request, the last steps can be repeated, to sequentially ask the user for more information.

Finally the request is completed and the client's web-browser 3 receives and displays the full response document.

Figure 2A:
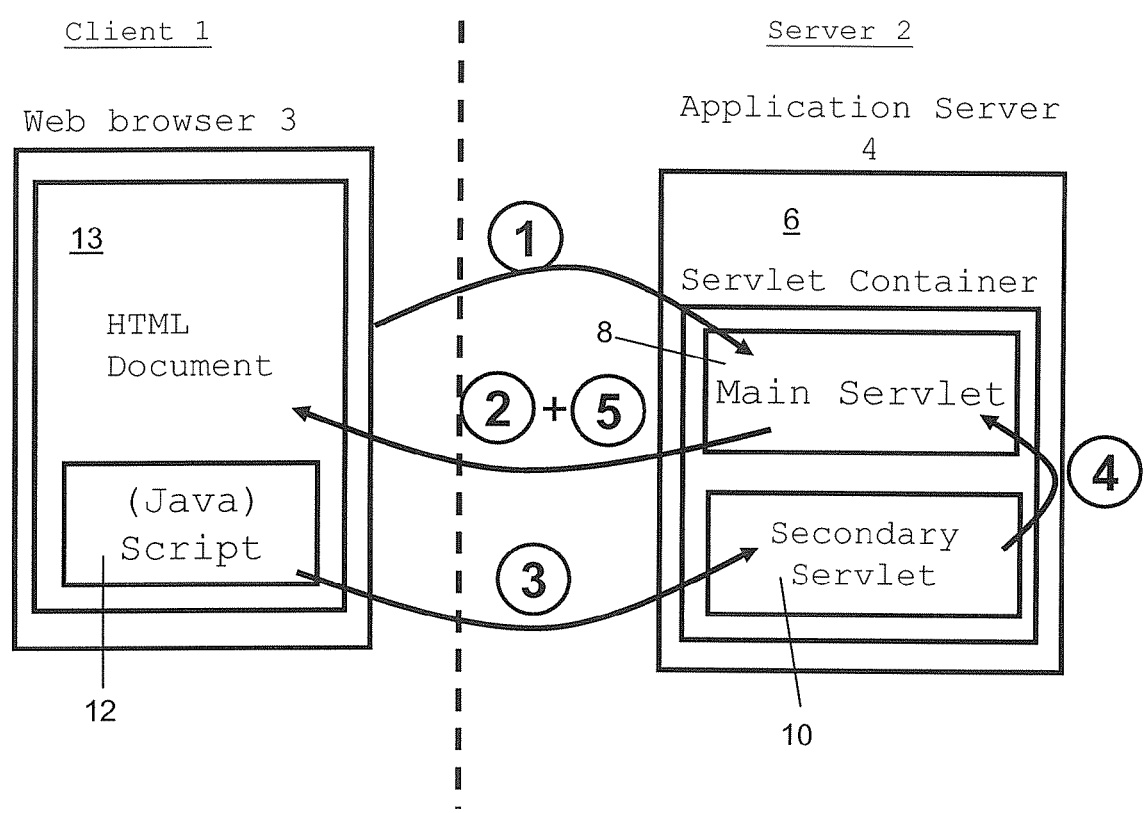
FIG. 2A shows a Client-Server architecture with an implementation of a preferred embodiment of the inventive two-way communication path.
Figure 2B:
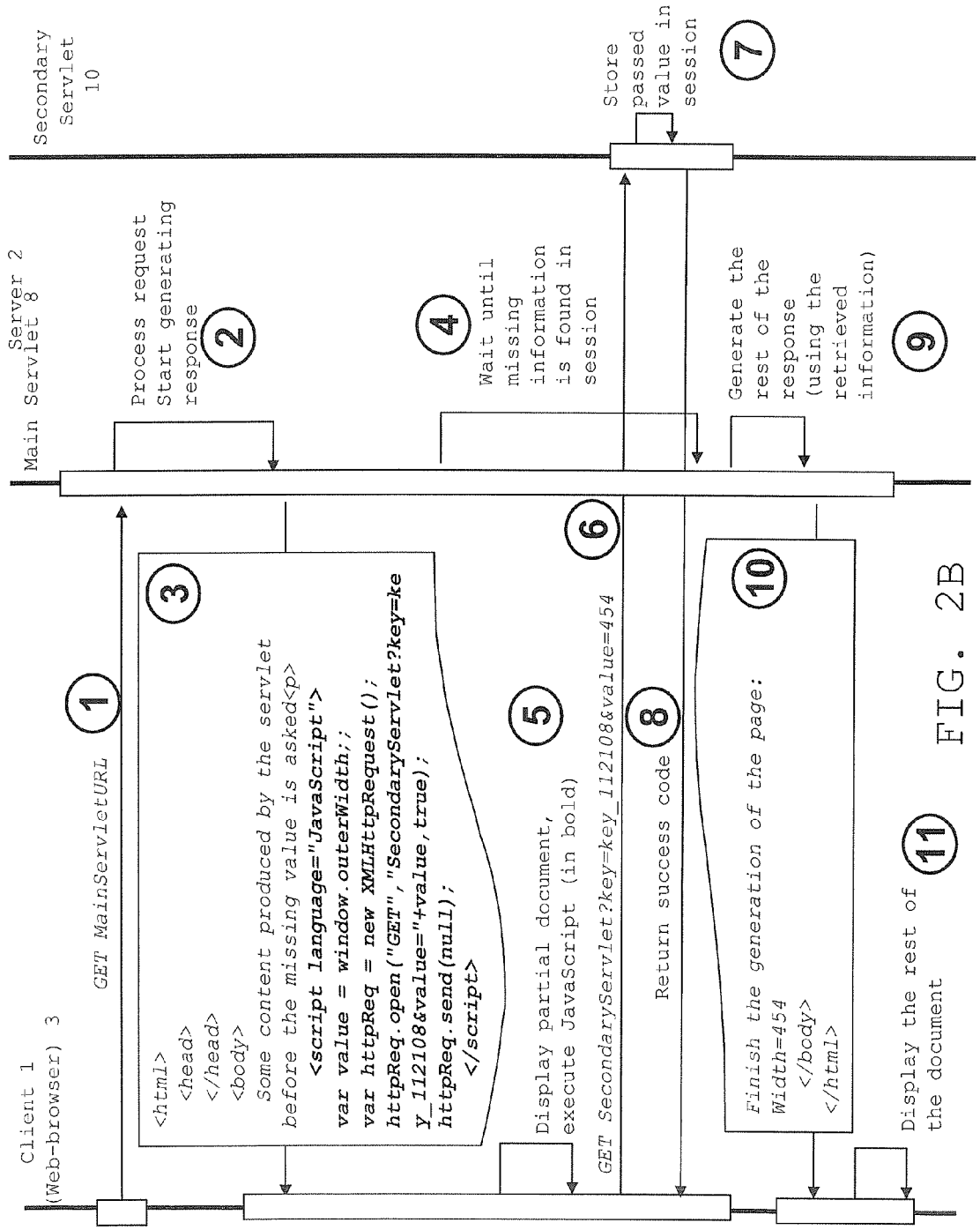
FIG. 2B shows a sequence diagram which describes communication steps between client's web-browser, main Servlet and secondary Servlet in the given example.

FIG. 2 B describes the activities and communication that takes place between the client's web-browser and the 2 Servlets in this example according to present invention:

(1) The client's web-browser sends the initial request to the main Servlet 8 by sending an HTTP GET command (alternative: a POST command could also be used) to the server 2, requesting the URL of the main Servlet 8. This request could also contain additional parameters that could be used by the main Servlet 8 during the generation of the response document. In this example, there is no parameter, (2) The main Servlet 8 starts the generation of the response document by writing the beginning of the document until the point where it need the missing information (the width of the client's web-browser)

```
<html>
    <head>
    </head>
    <body>
```

Some content produced by the Servlet before the missing value is asked<p>,

At this point, to write the rest of the document, the main Servlet 8 needs the missing information. It generates a unique key, that will be used to store and find the missing value in the HTTP session, after the client's web-browser has sent it to the secondary Servlet 10, and appends to the content generated so far a JAVASCRIPT, which, when executed by the client's web-browser, will retrieve the value and sends it with the key to the secondary Servlet 10.

Here is how the script would look like in this example:

Line 2 retrieves the width of the web-browser 3 window, the following lines let the web-browser 3 open an HTTP-request to the secondary Servlet 10, passing as parameter the key (here the random value of the key is key__112108) and the retrieved value (here contained in the variable "value")

```
<script language="JavaScript">
    var value = window.outerWidth;
    var httpReq = new XMLHttpRequest( );
    httpReq.open("GET","SecondaryServlet?key=
    key__112108&value="+value ,true);
    httpReq.send(null);
</script>
```

(3) The partial document (the content generated so far and the script retrieved the missing value) is sent to the client's web-browser 3, by flushing the buffer of the main Servlet 8. When doing this, the application server changes the encoding of the HTTP response to "chunked", which indicates the client's web-browser 3 that the content will be transferred in several chunked pieces. FIG. 2 shows the content of the document transferred to the client's web-browser at this point.

(4) The main Servlet 8 suspends its execution until it finds in the HTTP-session a value stored under the key it has generated in step (2). Technically it suspends its execution and checks at regular interval if the value is available or not. Once the value is found, it resumes its execution.

(5) Meanwhile the client's web-browser 3 has received the 1$^{st}$ chunk of the document sent by the main Servlet 8. It displays the displayable content contained in the document so far and executes the JAVASCRIPT embedded in it. Note that the JAVASCRIPT does not affect the content of the document at all.

(6) When executing the JAVASCRIPT, the client's web-browser 3 retrieves the width of its window (here 454 pixels) and sends an HTTP GET request to the secondary Servlet 10. (Alternative, a POST request could also be used). This request contains as parameter the key generated before (key__112108) and the retrieved value (454).

GET SecondaryServlet?key=key__112108&value=454, (7) The secondary Servlet 10 receives this request, decode the key and value out of its parameter and place in the HTTP-session the value (454) under the key (key__112108). Then it immediately returns a success code (HTTP code 200) (8), (8) The main Servlet 8, which checked at regular interval the HTTP session for a value stored under the key "key__112108", finds this value. It removes it from the session and resume the generation of the document, using the value it has retrieved. (In this example, the value is simply written in the text. In a more complex example it could be used to do a more complex layout of the document).

$2^{nd}$ chunked part of the document sent to the client's web-browser 3:

```
Finish the generation of the page: Width=454
</body>
</html>
```

(9) The $2^{nd}$ chunked part of the document is sent to the client's web-browser, and the main Servlet 8 closes the communication channel with client's web-browser 3, indicating that no more content will follow.

(10) The client's web-browser 3 displays the rest of the document.

For more detailed execution diagrams, see FIG. 1.

For the complete source code of this example see the appendix at this end of this document.

APPENDIX

```
Source 1: Main Servlet
import java.io.*;
import javax.Servlet.*;
import javax.Servlet.http.*;
public class MainServlet extends HttpServlet implements Servlet {
/**
* URL of the secondary Servlet storing the requested key/value pairs
* in the HTTP session
*/
private final static String SECONDARY_SERVLET_URL = "SecondaryServlet";
/**
* @see javax.Servlet.http.HttpServlet#void
   (javax.Servlet.http.HttpServletRequest,
   javax.Servlet.http.HttpServletResponse)
*/
public void doGet(HttpServletRequest req, HttpServletResponse resp)
    throws ServletException, IOException {
    resp.setContentType("text/html; charset=ISO-8859-4");
    HttpSession session = req.getSession( );
    PrintWriter out = resp.getWriter( );
    out.println("<html>");
    out.println("  <head>");
    out.println("  </head>")
    out.println("  <body>");
    // Starts the generation of the response
    out.println(
        "   Some content produced by the Servlet before the missing value is asked<p>");
    // (...)
    // at some point during the processing of the answer,
    // the Servlet notices that some information are missing
    // Suspends the generation of the response.
    // Asks the client's web-browser's to retrieve the missing value and send it to
    // the server through the secondary Servlet
    // The 3rd parameter is the JavaScript expression retrieving
    // the value when executed in the browser.
    // In this example we ask the client's web-browser for the width of the
    browser window
    Object value = requestValue(req, resp, "window.outerWidth;");
    // When this method returns, the local variable "value" contains the
    requested value
    // Continue the generation of the response
    // (...)
    out.println("Finish the generation of the page: Width=" + value);
    out.println("  </body>");
    out.println("</html>");
}
/**
* Generates a unique key that can be used to store the missing value in
the Web session
*/
private String generateKey( ) {
    return "key_" + System.currentTimeMillis( );
}
/**
* Requests the client's web-browser to provide the Servlet a missing value.
* This methods generates and transmit a JavaScript to be interpreted
* by the client's web-browser. This JavaScript retrieves the missing value
* by executing a JavaScript expression given as parameter,
* and sends a request to the secondary Servlet that will store
* the retrieved value in the HTTP session, to that it is accessible
* for the main Servlet.
* Note that this method will block and suspend the main Servlet, until
```

```
 * the missing value has been returned by the client's web-browser.
 *
 * @param req The main HTTP request sent by the client's web-browser to this main
 Servlet
 * @param resp The HTTP response used by this Servlet to respond to the request
 * @param JavaScriptExpression The JavaScript expression, which when executed
 * in the client's web-browser, returns the missing information needed by this Servlet
 * @return The missing value returned by the client's web-browser.
 */
private Object requestValue(
   HttpServletRequest req,
   HttpServletResponse resp,
   String JavaScriptExpression)
   throws IOException {
   PrintWriter out = resp.getWriter( );
   HttpSession session = req.getSession( );
   // Generates a unique key, that will be used to store/retrieve the
   // missing value in the current HTTP session
   String key = generateKey( );
   // Starts the generation of a JavaScript that will retrieve
   // the information from the client's web-browser
   out.println("     <script language=\"JavaScript\">");
   // In this example the client's web-browser will prompt the user to enter
   the missing value
   out.println("var value = " + JavaScriptExpression + ";");
   // once the value has been retrieved on stored on the client side
   // in a JavaScript variable, transmit this value to the server through
   // the secondary Servlet
   // Makes the client's web-browser open an HTTP request to the secondary Servlet,
   // passing the key and value of the missing information
   out.println("var httpReq = new XMLHttpRequest( );");
   out.println(
      "httpReq.open(\"GET\", \""
         + SECONDARY_SERVLET_URL
         + "?key="
         + key
         + "&value=\"+value,true);");
   out.println("httpReq.send(null);");
   out.println("     </script>");
   // Flushes the buffer of the Servlet, so that the JavaScript retrieving the
   // missing value is transmitted and executed immediately by the client's
   web-browser
   resp.flushBuffer( );
   // Suspends the execution of the main Servlet until a value can be found
   // in the HTTP session under the key defined previously
   Object value = session.getAttribute(key);
   while (value == null) {
      try {
         Thread.sleep(100);
      } catch (InterruptedException e) {
         e.printStackTrace( );
      }
      value = session.getAttribute(key);
   }
   // Now that the value has been extracted, remove its key/value pair from
   // the session, to avoid memory leaks and allow the same key to be reused
   // several times
   session.removeAttribute(key);
   return value;
   }
}
Source 2: Secondary servlet
   import java.io.*;
   import javax.servlet.*;
   import javax.servlet.http.*;
   /**
    * Secondary Servlet updating the HTTP session with key/value pairs.
    * The key/value pairs to store are contained in the incoming requests
    * under the keys "key" and "value".
    * For example a request containing the parameters
    * "mySecondaryServletURL?key=myKey&value=myValue"
    * will store the value "myValue" under the key "myKey" in the HTTP session.
    */
   public class SecondaryServlet extends HttpServlet implements Servlet {
      /**
       * @see javax.servlet.http.HttpServlet#void
       (javax.servlet.http.HttpServletRequest, javax.servlet.http.HttpServletResponse)
       */
      public void doGet(HttpServletRequest req, HttpServletResponse resp)
         throws ServletException, IOException {
```

```
            // Extracts from the request coming from the browser the key/value pair
            // to store in the HTTP session
            String key = req.getParameter("key");
            String value = req.getParameter("value");
            if (key != null) {
                // Store this key/value pair in the HTTP session
                req.getSession( ).setAttribute(key, value);
                }
        }
}
```

The invention claimed is:

1. A method comprising:

providing a one way communication path that initiates an initial request by a client for retrieving information from a servlet of a server, and sending an initial response by the servlet containing at least a return code specifying success or failure of the request, and including the requested information, if available; and if the servlet identifies missing information needed for processing of, and not included in, the initial request, suspending processing of the initial request and generation of the initial response by the servlet, providing a response from the servlet to automatically open another communication path between the client and the servlet and providing the missing information for the initial request from the client to the servlet by making use of a response functionality of the initial request, wherein the other communication path is supported by a further servlet functionality component and is utilized to provide the missing information while the one way communication path for the initial request remains open.

2. The method of claim 1, wherein the further servlet functionality component comprises:

generating a script that when executed at a web-browser of the client retrieves the missing information and invokes the further servlet functionality component by the servlet;

appending the script to the response indicating it as a partial response;

sending the response including the script to the client's web-browser;

suspending execution of the initial response by the servlet until the missing information will be available;

receiving the missing information by the further servlet functionality component, wherein the missing information is contained in a new request created by the script during its execution on the client's web-browser;

providing the missing information to the servlet; and continuing execution of the initial response by the servlet using the missing information for retrieving the rest of the response and providing the rest of the response to the client's web-browser for displaying.

3. The method according to claim 2, wherein the further servlet functionality component is implemented as a separate secondary servlet.

4. The method according to claim 3, wherein the secondary servlet receives a new HTTP-request sent by the script, and stores the missing information in a shared memory used by both servlets.

5. The method according to claim 3, wherein the missing information is stored by the secondary servlet in a current HTTP session object between the client and the server and passed to the servlet.

6. The method according to claim 2, wherein execution of the script by the web-browser automatically retrieves the missing information or retrieves the missing information by an additional user input.

7. The method according to claim 2, wherein the script is implemented as a Java Script.

8. The method according to claim 2, wherein the script contains the missing information with an assigned key generated by the servlet.

9. The method according to claim 1, wherein the communication is via the HTTP protocol.

10. The method according to claim 1, wherein the further servlet functionality component is part of the servlet and receipt of a new HTTP request by the servlet automatically starts a second instance of the servlet, and updates a current HTTP session object with the missing information.

11. The method according to claim 1, wherein the servlet is implemented as a Java servlet.

12. A server system in a client-server architecture that uses a communication protocol, said server system comprising:

at least one storage system for storing a computer program and at least one servlet for retrieving information; and at least one processor for processing the computer program and at least one servlet to:

provide a one way communication path that initiates an initial request by a client for retrieving information from said servlet, and to send an initial response by said servlet containing at least a return code specifying success or failure of said request, and including the requested information, if available;

identify missing information needed for processing of, and not included in, said initial request for providing a complete response;

suspend processing of the initial request and generation of the initial response;

provide a response from said servlet to automatically open another communication path between the client and said servlet and provide the missing information for the initial request from the client to said servlet by making use of the response functionality of said initial request if missing information is identified, wherein the other communication path is supported by a further servlet functionality component and is utilized to provide the missing information while the one way communication path for the initial request remains open.

13. The server system according to claim 12, wherein said at least one processor processes the further server functionality component to:

generate a script that when executed at a web-browser of the client retrieves the missing information and invokes the further servlet functionality component by said servlet;

append said script to said response indicating it as a partial response;

send said response including said script to said client's web-browser;
suspend execution of said initial response by said servlet until said missing information will be available;
receive the missing information, wherein said missing information is contained in a new request created by said script during its execution on said client's web-browser;
provide said missing information to said servlet; and
continue execution of said initial response by said servlet using said missing information to retrieve the rest of the said response and provide said rest of said response to said client's web-browser for displaying.

14. The server system according to claim 13, wherein the further servlet functionality component is implemented as a separate secondary servlet.

15. The server system according to claim 14, wherein said at least one processor processes said separate secondary servlet to receive a new HTTP-request sent by said script and to store said missing information in a shared memory used by both servlets.

16. The server system according to claim 14, wherein said at least one processor processes said secondary servlet to store said missing information in a current HTTP session object between said client and said server system, wherein said missing information is passed to said servlet.

17. The server system according to claim 13, wherein execution of said script by said web-browser automatically retrieves said missing information or retrieves said missing information by an additional user input.

18. The server system according to claim 13, wherein said script is implemented as a Java Script.

19. The server system according to claim 13, wherein said script contains said missing information with an assigned key generated by said servlet.

20. The server system according to claim 12, wherein said communication protocol is HTTP.

21. The server system according to claim 12, wherein the further servlet functionality component is part of said servlet and receipt of a new HTTP request by said servlet automatically starts a second instance of said servlet, and updates a current HTTP session object with said missing information.

22. The server system according to claim 12, wherein said servlet is implemented as a Java servlet.

23. A computer program product comprising a computer useable storage device with computer executable instructions stored thereon that when executed by a computer system perform the steps of:
providing a one way communication path that initiates an initial request by a client for retrieving information from a servlet of a server, and sending an initial response by the servlet containing at least a return code specifying success or failure of the request, and including the requested information, if available; and
if the servlet identifies missing information needed for processing of, and not included in, the initial request, suspending processing of the initial request and generation of the initial response by the servlet, providing a response from the servlet to automatically open another communication path between the client and the servlet and providing the missing information for the initial request from the client to the servlet by making use of a response functionality of the initial request, wherein the other communication path is supported by a further servlet functionality component and is utilized to provide the missing information while the one way communication path for the initial request remains open.

24. The program product of claim 23, wherein the further servlet functionality component comprises:
generating a script that when executed at a web-browser of the client retrieves the missing information and invokes the further servlet functionality component by the servlet;
appending the script to the response indicating it as a partial response;
sending the response including the script to the client's web-browser;
suspending execution of the initial response by the servlet until the missing information will be available;
receiving the missing information by the further servlet functionality component, wherein the missing information is contained in a new request created by the script during its execution on the client's web-browser;
providing the missing information to the servlet; and
continuing execution of the initial response by the servlet using the missing information for retrieving the rest of the response and providing the rest of the response to the client's web-browser for displaying.

25. The program product according to claim 24, wherein the further servlet functionality component is implemented as a separate secondary servlet.

26. The program product according to claim 25, wherein the secondary servlet receives a new HTTP-request sent by the script, and stores the missing information in a shared memory used by both servlets.

27. The program product according to claim 25, wherein the missing information is stored by the secondary servlet in a current HTTP session object between the client and the server and passed to the servlet.

28. The program product according to claim 24, wherein execution of the script by the web-browser automatically retrieves the missing information or retrieves the missing information by an additional user input.

29. The program product according to claim 24, wherein the script is implemented as a Java Script.

30. The program product according to claim 24, wherein the script contains the missing information with an assigned key generated by the servlet.

31. The program product according to claim 23, wherein the communication is via the HTTP protocol.

32. The program product according to claim 23, wherein the further servlet functionality component is part of the servlet and receipt of a new HTTP request by the servlet automatically starts a second instance of the servlet, and updates a current HTTP session object with the missing information.

33. The program product according to claim 23, wherein the servlet is implemented as a Java servlet.

* * * * *